United States Patent [19]

O'Neil et al.

[11] Patent Number: 5,338,574
[45] Date of Patent: Aug. 16, 1994

[54] METHOD FOR PRODUCING A PAINTED SILICONE ELASTOMER

[75] Inventors: Virginia K. O'Neil; Andreas T. F. Wolf, both of Midland, Mich.

[73] Assignee: Dow Corning Corporation, Midland, Mich.

[21] Appl. No.: 40,047

[22] Filed: Mar. 30, 1993

[51] Int. Cl.$^5$ ............................................. B05D 3/02
[52] U.S. Cl. ...................................... 427/387; 427/377; 427/417
[58] Field of Search ............ 427/377, 387, 380, 407.1, 427/417, 419.1

[56] References Cited

U.S. PATENT DOCUMENTS

| | | | |
|---|---|---|---|
| 2,414,089 | 1/1947 | Branson | 427/377 |
| 2,460,795 | 2/1949 | Warrick | 427/377 |
| 3,505,099 | 4/1970 | Neuroth | 427/387 |
| 3,542,714 | 11/1970 | Mehers | 260/24 |
| 3,567,493 | 3/1971 | Wessel | 427/387 |
| 3,619,256 | 11/1971 | Pepe et al. | 427/377 |
| 3,812,164 | 9/1974 | Schulz | 260/37 SB |
| 3,836,502 | 9/1974 | Schulz | 260/37 SB |
| 3,836,503 | 9/1974 | Schulz | 260/37 SB |
| 3,923,736 | 12/1975 | Nitzsche et al. | 427/377 |
| 3,935,348 | 1/1976 | Smith | 427/413 |
| 3,957,714 | 5/1976 | Clark et al. | 260/336 SB |
| 4,313,981 | 2/1982 | Namiki | 427/409 |
| 4,358,558 | 11/1982 | Shimizu | 524/379 |
| 4,447,576 | 5/1984 | Fukayama et al. | 524/714 |
| 4,471,007 | 9/1984 | Pate | 427/340 |
| 4,517,238 | 5/1985 | Mine et al. | 427/387 |
| 4,683,251 | 7/1987 | Mikami | 522/46 |
| 4,759,992 | 7/1988 | Tomko et al. | 427/387 |
| 4,902,575 | 2/1990 | Yakimoto et al. | 428/447 |
| 4,906,707 | 3/1990 | Yakimoto et al. | 525/403 |
| 4,965,311 | 10/1990 | Hirose et al. | 524/483 |
| 4,985,476 | 1/1991 | Endres et al. | 523/210 |
| 5,063,270 | 11/1991 | Yokimoto et al. | 524/306 |
| 5,238,708 | 8/1993 | Blizzard | 427/387 |

FOREIGN PATENT DOCUMENTS 210442 2/1987 European Pat. Off.

OTHER PUBLICATIONS

Encyclopedia of Polymer Science and Engineering, Second Edition, vol. 5, p. 207, second full paragraph; 1986 (no month available).

*Primary Examiner*—Shrive Beck
*Assistant Examiner*—D. L. Dudash
*Attorney, Agent, or Firm*—Roger H. Borrousch

[57] ABSTRACT

A method produces a surface of a cured silicone elastomer with a hardened protective coating when an RTV silicone composition is blended with an oxygen curing compound, exposing the resulting composition to moisture to produce a cured dull surface, then applying a hardenable protective coating composition (such as paint) to the cured surface to obtain a flaw-free film, and then allowing the coating composition to harden.

51 Claims, No Drawings

METHOD FOR PRODUCING A PAINTED SILICONE ELASTOMER

BACKGROUND OF THE INVENTION

1. Field of the Invention

This invention relates to a method for producing silicone elastomer with a painted surface. More specifically, this invention relates to a method for producing a painted surface on a silicone elastomer obtained from a room temperature vulcanizable (RTV) silicone elastomeric composition.

2. Background Information

Silicone compositions which cure to produce elastomers at room temperature are widely used as sealants and caulking materials because they have a unique property profile for applications, such as in building construction. These properties include excellent weatherability, resistance to heat, maintaining their flexibility at low temperatures, ease of application, and rapid cure in place. However, the structures in which such sealants and caulking materials are used are often coated with decorative and protective coatings, such as with paints, varnishes, lacquers, and shellacs. Silicone elastomers have a disadvantage in that they do not have surfaces which accept such organic based decorative and protective coatings. It is desired to have the exposed surface of the silicone elastomers accept painting, for aesthetic purposes, and also may be applied to provide some protection of the surface from the environment. While some silicone elastomers accept some paints, it is very inconvenient to commercially provide certain silicone elastomeric compositions for painting with certain kinds of paint.

Many persons have advanced approaches to solving the painting problem of silicone elastomers. Metters describes in U.S. Pat. No. 3,542,714, issued Nov. 24, 1970, that by incorporating 0.5 to 10 weight percent rosin into dimethylpolysiloxane rubbers, the resulting rubber could be painted. Matters describes many kinds of dimethylsiloxane elastomers and teaches that the paintability of these elastomers can be improved by adding unmodified rosin, modified rosin, or rosin derivatives. Rosin is obtained from the oleoresin or stump wood of pine trees and the primary ingredient in the rosin is abietic acid. Metters teaches that the rosin has a compatibility such that a film of the rosin is formed on the surface of the elastomer. The rosin is added to the compositions of Matters by mixing it with a solvent such as toluene. Solvent, such as toluene is environmentally unacceptable.

Schulz in U.S. Pat. No. 3,812,164, issued May 21, 1974, in U.S. Pat. No. 3,836,502, issued Sep. 17, 1974, and U.S. Pat. No. 3,836,503, issued Sep. 17, 1974, teaches three specific kinds of compounds which can be used in RTV silicone elastomeric compositions which contain an alkoxy silicon compound as the crosslinker. These specific compounds are silanes of the following formulae

-continued

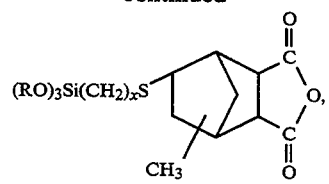

and

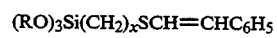

wherein R is methyl, ethyl or propyl, a is 0 or 1, and x is 1, 2, 3, or 4. Schulz teaches that these silanes are present in an amount of from 0.5 to 10 parts by weight per 100 parts by weight of a hydroxyl endblocked polydimethylsiloxane and that the combination of these silanes and alkoxy silicon compound (crosslinker) provides from 1 to 15 parts by weight per 100 parts by weight of the hydroxyl endblocked polydimethylsiloxane. Schulz also teaches that for these kinds of compositions the cured products can be painted with both latex based paints and oil based paints and that the elastomers have improved heat stability and improved adhesion to substrates.

Clark et al in U.S. Pat. No. 3,957,714, issued May 18, 1976, teach that silicone rubber compositions which cure to elastomers with paintable surfaces are those which are made from hydroxyl endblocked polydimethylsiloxane, monoalkyltriacetoxysilane, an organotin carboxylate, finely divided agglomerated precipitated acicular calcium carbonate, and organic solvent. Although these composition provide a specific RTV silicone composition which cures to an elastomer with a surface which can be painted with at least one decorative organic based paint, such organic solvent containing compositions are environmentally unacceptable today because they have too high a content of volatile organic material, the organic solvent. Furthermore, the high shrinkage caused by the evaporation of the organic solvent has a negative effect on the sealing capability of these sealants.

Shimizu in U.S. Pat. No. 4,358,558, issued Nov. 9, 1982, teaches that a paintable RTV polyorganosiloxane composition contains a silanol-terminated polydiorganosiloxane, an aminoxy functional organosilicon compound (crosslinker), an inorganic filler, and a monohydric unsaturated alcohol containing a carbon-to-carbon triple bond and a hydroxyl group bonded with a primary or secondary carbon atom. Shimizu teaches that these RTV silicone compositions cure to provide adhesive surfaces to which paint will adhere. The monohydric unsaturated alcohols are environmentally unacceptable volatile organic materials.

Fukayama et al in U.S. Pat. No. 4,447,576, issued May 8, 1984, teach paintable, RTV cured polyorganosiloxane sealants made from a hydroxyl-terminated polyorganosiloxane, an organosilicon compound containing at least two amido groups, aminoxy groups or combinations of these groups (crosslinker), and a substituted alcohol which contains as a substituent, an acyloxy, alkoxycarbonyl, cyano, amino, amido, mercapto, or a combination of a carbon-to-carbon triple bond and an ether-type oxygen atom. Fukayama et al teach that their compositions provide sealants with exposed surfaces with sufficient adhesiveness to be coated with paints.

Although each of the forgoing patents teach various solutions to the paintability problem of silicone rubber, they each are faced with difficulties and are specific to kinds of silicone rubber. Even today, the state of the art is such that silicone rubber is consider to be unpaintable, see U.S. Pat. No. 5,063,270, issued Nov. 1, 1991, to Yukimoto et al; U.S. Pat. No. 4,965,311, issued Oct. 23, 1990, to Hirose et al; U.S. Pat. No. 4,906,707, issued Mar. 6, 1990, to Yukimoto et al; and U.S. Pat. No. 4,902,575, issued Feb. 20, 1990, to Yukimoto et al. Endres et al in U.S. Pat. No. 4,985,476, issued Jan. 15, 1991, teach that the so called neutral based joint sealants, RTV-1K systems cannot be coated with lacquers and that some sealing compounds must be brushed with solvent prior to painting.

It is desirable to provide a method suitable for many kinds of RTV silicone elastomeric compositions that cure to elastomers having surfaces paintable with many kinds of protective coatings and at the same time be environmentally acceptable. Such is the objective of this invention.

SUMMARY OF THE INVENTION

This invention relates to a method of producing a cured silicone elastomer with a surface coated with a hardened protective coating comprising blending a room temperature vulcanizable silicone composition comprising a polydiorganosiloxane having condensable end groups, a moisture sensitive silicon-crosslinker, and a filler with an oxygen curing compound to make a modified composition, exposing the modified composition to moisture until a cured elastomeric surface is obtained and a homogeneous dull surface develops, thereafter applying a protective coating composition hardenable at ambient conditions over at least a portion of the cured elastomeric surface where the protective coating composition wets the surface to which it is applied and produces an essentially flaw-free film, thereafter allowing the protective coating composition to harden.

DETAILED DESCRIPTION OF THE PREFERRED EMBODIMENTS

The method of the present invention provides RTV silicone elastomeric compositions which cure to provide surfaces which can be painted with both latex paint and oil based paint (alkyd paint). The method of this invention is coating the surface of a cured RTV silicone elastomer with a hardenable protective coating, such that it forms a flawless film on the surface of the cured RTV silicone elastomer and hardens. The hardenable protective coatings include varnishes, lacquers, shellacs, and paints of either the latex type, such as acrylic latex paints or the oil based type, such as the alkyd paints.

An RTV silicone composition is blended with an oxygen curing compound to make a modified composition- The RTV silicone compositions can be those known in the art which comprise a polydiorganosiloxane having condensable end groups, a moisture sensitive silicon-crosslinker, and a filler, and optionally a curing catalyst for the composition.

The polydiorganosiloxane having condensable end groups are those which are essentially composed of diorganosiloxane units ($R'_2SiO$), but small amounts of other siloxane units may be present, such as monoorganosilsesquioxane units or $SiO_2$ units which provide branching and triorganosiloxy units which provide terminations of the polymer chains. $R'$ is a monovalent hydrocarbon radical or a halogenated monovalent hydrocarbon radical. Examples of monovalent hydrocarbon radicals are alkyl radical such as methyl, ethyl, propyl, and n-octyl,; alkenyl radicals such as vinyl and allyl; aryl radicals such as phenyl or tolyl; cycloalkyl radicals such as cyclohexyl, and aralkyl radicals such as 2-phenylethyl. Examples of halogenated monovalent hydrocarbon radicals are perfluoroalkylethyl radicals such as 3,3,3-trifluoropropyl, and another halogenated radical is gamma-chloropropyl. The polydiorganosiloxanes useful in this invention are those which contain condensable end groups which can be hydroxyl groups, or hydrolyzable groups such as silicon-bonded alkoxy groups, acyloxy groups, ketoximo groups, amino groups, amido groups, aminoxy groups, and alkenoxy groups. Polydiorganosiloxanes which contain the hydrolyzable groups generally have chain terminating siloxane units of the formula-$Si(R')_y(X)_{(y-3)}$ in which $R'$ is a monovalent hydrocarbon radical or a halogenated hydrocarbon radical, X is a hydrolyzable group, and y is 1, 2, or 3.

The moisture sensitive crosslinker is a silicon compound which contains at least two hydrolyzable groups per molecule, preferably more than two hydrolyzable groups per molecule. In those situations in which the polydiorganosiloxane contains more than two hydrolyzable groups per molecule, the crosslinker can have two hydrolyzable groups per molecule. The moisture sensitive crosslinkers can be silanes or partially hydrolyzed products of the silanes. Examples of silicon-bonded hydrolyzable groups on the crosslinkers are alkoxy groups, acyloxy groups, ketoximo groups, amino groups, amido groups, aminoxy groups, and alkenoxy groups. Examples of alkoxy groups are methoxy, ethoxy, n-propoxy, isopropoxy, and methoxyethoxy. Examples of acyloxy groups are acetoxy, octanoyloxy, and benzoyloxy. Examples of ketoximo groups are dimethylketoximo, methylethylketoximo, and diethylketoximo. Examples of amino groups are N,N-diethylamino, N-ethylamino, N-propylamino, N,N-methylcyclohexylamino, N-butylamino, and N-cyclohexylamino. Examples of akenyloxy groups are propenoxy, isopropenoxy, and butenoxy. Examples of amido groups are N-methylacetamido, N-ethylacetamido, N-butylacetylamido, and N-methylbenzamido. Example of aminoxy groups are N,N-dimethyl-aminoxy, N,N-methylethylaminoxy, and N,N-diethylaminoxy.

Examples of crosslinkers are methyltrimethoxysilane, methyltriethoxysilane, vinyltrimethoxysilane, methylphenyldiethoxysilane, 3,3,3-trifluoropropyltrimethoxysilane, methyltriacetoxysilane, vinyltriacetoxysilane, phenyltripropionoxysilane, methyltri(methylethylketoximo)silane, vinyltri(methylethylketoximo)silane, ethyltri(N,N-diethylamino)silane, methyltri(N-methylacetamido)silane, dimethyldi(N,N-dibutylamino)silane, vinyltri(N-methyl-N-cyclohexyl)silane, methylvinyldi(N-methylacetamido)silane, methyltri(isoprenoxy)silane, n-propylorthosilicate, and ethylpolysilicate.

The crosslinker is used in amounts which are conventionally used for making curable silicone elastomeric compositions which cure at room temperature. The amounts used will vary depending upon the particular crosslinker chosen and the properties of the cured elastomer desired.

A mixture of polydiorganosiloxane and crosslinker will usually cure at room temperature when exposed to moisture, however, sometimes this time period is too slow for practical applications and it is desirable to accelerate the cure rate, which means reducing the time to cure composition. In these situations, a catalyst is used. These catalysts include metal salts of carboxylic acids such as dibutyl tin dilaurate, dibutyl tin diacetate, and tin 2-ethylhexoate; organotitanates such as tetrabutyl titanate, tetra-n-propyl titanate, diisopropoxydi(ethoxyacetoacetyl) titanate, and bis(acetylacetonyl)diisopropyl titanate.

In order for the RTV silicone compositions to have desirable properties, they need to contain a filler. One or more fillers can be used. The filler can be a reinforcing filler such as fumed silica, precipitated silica, certain finely divided calcium carbonate, carbon black, and siloxane resins such as those comprised of trimethylsiloxy units and $SiO_{4/2}$ units. These reinforcing fillers can have surfaces which are treated or untreated, as is known in the art. The filler can be an extending filler such as calcium carbonate, finely divided quartz, diatomaceous earth (considered a semi-reinforcing filler), iron oxides, titanium dioxide, and zinc oxide.

Other ingredients which are conventionally used in formulating RTV silicone compositions used as sealants and caulking materials can be used in these compositions, as long as, they do not interfere with the oxygen curing compounds ability to provide a surface which can be coated with a hardenable protective coating, such as paints. These ingredients include non-slump agents and additives to provide mildew resistance.

The RTV silicone composition is blended with an oxygen curing compound to make a modified composition. These oxygen curing compounds are compounds which cure by reacting with oxygen, such as the oxygen in the atmosphere (air). These oxygen curing compounds undergo this reaction at ambient conditions. Examples of oxygen curing compounds include the natural drying oils, such as tung oil, linseed oil, vernonia oil, and oiticica oil; and modified natural drying oils such as boiled linseed oil and dehydrated castor oil. Other compounds which react with the oxygen and cure include various liquid diene compounds and fatty acid esters which are unsaturated, preferably those which have more than 10 carbon atoms. Tung oil and oiticica oil are preferred because they provide the broadest utility with different kinds of RTV silicone compositions and hardenable protective coatings and give the most improved results, in that, protective coating compositions of many kinds can be applied to provide flawless films and excellent adhesion of the protective coating when cured.

An effective amount of oxygen curing compound is used in this method to make the modified compositions. An effective amount of oxygen curing compound is that amount which allows a flaw-free film of hardenable protective coating to form on a cured surface of the modified composition. For natural drying oils, the effective amount is within the range of from 0.5 to 10 weight percent based on the total weight of the modified composition. The preferred amount of natural drying oil is from 0.5 to 4 weight percent based on the total weight of the composition.

After a modified composition is obtained, it is exposed to moisture, such as atmospheric moisture until a cured elastomeric surface is obtained. Different RTV silicone compositions will cure at different rates, however, one can estimate the time to achieve surface cure by checking the surface to see if it is tacky. If lightly touching the surface with a finger, a tackiness is observed the surface has not yet reached the cured state, however, if no tack is observed, the surface is considered cured. It is usually desired to have the surface reach the cured state in a few hours to one day to avoid dust and dirt from blowing onto and adhering to the surface.

Cured silicone elastomeric surfaces are known to have glossy to highly glossy surfaces. This characteristic is believed to inhibit the ability of such surfaces to be satisfactorily coated with a hardenable protective coating composition and hardened into a film, i.e. painted. Therefore, a cured silicone elastomeric surface does not result in a surface which satisfactorily wets out protective coating compositions, allows them to harden in a reasonable time, and results in an essentially flaw-free film. The modified compositions initially cure to a glossy surface which is not receptive of hardenable latex and other low viscosity protective coating compositions such that they will produce essentially flaw-free hardened films. Over a period of time the cured surfaces of the modified composition becomes dull and has a velvet appearance, i.e. a dull surface or finish, or as is also known as a matte finish (mat finish). As the cured surface of the modified composition becomes dull, it satisfactorily wets out latex and other low viscosity hardenable protective coating compositions which harden to provide essentially flaw-free films. Alkyd based and high viscosity protective compositions can develop adhesion to the cured surface at the point that the surface becomes dull. Therefore, the modified compositions upon exposure to moisture cure to an elastomeric surface which then becomes dull before a hardenable protective coating composition is applied and an essentially flaw-free film can be obtained. The dull surface which develops, needs to be a homogeneous dull surface. The term "homogeneous dull surface" means that the surface is the same from point to point to point (point referring to a location on the surface).

After the surface of the modified composition is cured, a protective coating composition which is hardenable at ambient conditions is applied over the surface producing an essentially flaw-free film (flawless). By essentially flaw-free, it is to be understood, that the application of the protective coating composition may encounter a foreign substance on the surface which was deposited on the surface from the air. Minor flaws may be eliminated by applying a second coating of the protective composition. It is not essential that the protective coating adhere to the surface of the modified composition to be within the scope of this invention because in many applications stress is not a consideration. It is preferred that the hardenable protective coating film adhere to the surface of the cured modified composition. Many of the protective coatings, such as the alkyd paints (oil based) and latex paints (acrylic based emulsions) are flexible enough so that adhesion of the paint to the surface of the cured modified composition is most desirable.

After the protective coating composition is applied to the cured surface of the modified composition, it is allowed to harden. This produces a cured silicone elastomer with a surface coated with a hardened protective coating. The protective coating composition will harden if the surface of the modified composition is compatible with the protective coating composition. By compatible, it is to be understood that a flaw-free film is produced when the protective coating composition is applied to the surface and it hardens under ambient conditions. If it does not produce a flaw-free film or it does not harden under ambient conditions, then it is considered incompatible. The protective coating compositions usually harden within a few hours to a day and the adhesion if it occurs will usually be observed within a few hours to a few days. Latex paints may take several weeks to develop 100% adhesion to a cured surface of modified composition.

Because the oxygen curing compound often separates from the remainder of the modified composition upon storage and would require mixing before use, it is preferred that at least part of the RTV silicone composition be stored on one package and the oxygen curing compound is stored in another package. The modified composition is prepared by mixing (blending) the contents of the packages just prior to exposing the modified composition to moisture.

One preferred method of this invention uses as the RTV silicone composition, a mixture obtained by mixing a hydroxyl endblocked polydiorganosiloxane, a filler, and as the moisture sensitive crosslinker, a ketoximosilicon crosslinker having at least three silicon-bonded ketoximo groups per molecule. A ketoximosilicon compound can be a mixture of ketoximosilanes and alkoxyketoximosilanes. One such ketoximosilane mixture comprises methyltri(methylethylketoximo)silane, methyldi(methylethylketoximo)methoxysilane, and methyldimethoxy(methylethylketoximo)silane and another ketoximosilane mixture comprises a mixture of tetraketoximosilane, monoethoxytri(methylethylketoximo)silane, diethoxydi(methylethylketoximo)silane, and triethoxymono(methylethylketoximo)silane. The latter mixture is known in the art, for example in U.S. Pat. No. 4,657,967, issued to Klosowski et al on Apr. 14, 1987, and in U.S. Pat. No. 4,973,623, issued to Haugsby et al on Nov. 27, 1990, both of which are hereby incorporated by reference to show ketoximosilane mixtures and RTV silicone compositions made using the ketoximosilane mixtures. RTV silicone compositions made from these ketoximosilane mixture preferably contain a catalyst, such as a tin catalyst such as dibutyl tin dilaurate, or a titanate catalyst such as diisopropoxy di-(ethoxyacetoacetyl) titanate. These RTV silicone compositions preferably contain natural drying oils as the oxygen curing compound and the most preferred natural drying oil is tung oil. These RTV silicone compositions preferably contain calcium carbonate as the filler Another preferred method of this invention uses as the RTV silicone composition, an aminoxysilicon crosslinker as the moisture sensitive silicon crosslinker and also contains as part of that crosslinker but acting as a chain extender, a diorganodi(amido)silane, such as methylvinyldi(N-methylacetamido)silane. These kinds of RTV silicone compositions are known from Toporcer et al in U.S. Pat. No. 3,817,909, issued Jun. 18, 1974, and Klosowski in U.S. Pat. No. 3,996,184, issued Dec. 7, 1976, both of these patents are incorporated by reference to show the combination of aminoxysilicon crosslinkers and amidosilane chain extenders. The chain extender can be used to make low modulus sealants useful in the building construction industry. These compositions can be prepared without the use of a catalyst. Calcium carbonate is a useful filler for such compositions. The most preferred compositions contain as the oxygen curing compound, natural drying oils of which tung oil is the most preferred.

A method of this invention includes using as the RTV silicone composition, a mixture comprising polydiorganosiloxane which has some hydroxyl endgroups and some trimethylsiloxy endgroups, and acetoxysilane as the moisture sensitive crosslinker. These RTV silicone compositions preferably contain a tin catalyst and as the filler a reinforcing silica. The polydiorganosiloxane which contains both hydroxyl endgroups and trimethylsiloxy endgroups is describe by Dupree in U.S. Pat. No. 3,274,145, issued Sep. 20, 1966, which is hereby incorporated by reference to show these kinds of polydiorganosiloxanes and compositions containing acetoxysilane crosslinkers. These RTV silicone compositions preferably contain as the oxygen curing compound, a natural drying oil of which tung oil is the most preferred.

A method of this invention comprises using a two package composition in which a first package comprises a hydroxyl endblocked polydiorganosiloxane, a filler, and may contain the oxygen curing compound, and a second package comprises the moisture sensitive silicon-crosslinker. The second package can also contain filler and a curing catalyst for the RTV silicone composition. If the oxygen curing compound is not present in the first package, it may be contained in a third package. One kind of RTV silicone composition of this kind, is where the moisture sensitive silicon-crosslinker is an alkoxysilicon crosslinker, such as n-propyl ortho silicate or ethylpolysilicate and a tin catalyst is used. Such compositions are well known in the art. The oxygen curing compound is preferably a natural drying oil, such as the preferred tung oil. These compositions are stored in separate packages to prevent premature curing which can occur if all the ingredients are mixed for too long a period before the use of the composition.

One method which uses as the moisture sensitive crosslinker, an alkoxysilicon compound, can contain all the ingredients in one package. Storage stable compositions can be obtained when a titanate catalyst is used as the curing catalyst, the ratio of the alkoxysilicon crosslinker to the endgroups of the polydiorganosiloxane are such that there is at least one alkoxysilicon crosslinker molecule per polydiorgansiloxane endgroup. The one package RTV silicone compositions which comprise the alkoxysilicon crosslinker are described in U.S. Pat. No. 3,161,614, issued Dec. 15, 1964 to Hyde et al, U.S. Pat No. 3,175,993, issued Mar. 30, 1965, to Weyenberg, U.S. Pat. No. 3,334,067, issued Aug. 1, 1967, and U.S. Pat. No. 4,871,827, issued Oct. 3, 1989, to Klosowski et al where these patents are hereby incorporated by reference to show the formulations useful for preparing one package RTV silicone composition in which the moisture sensitive crosslinker is an alkoxysilicon compound. In these methods, the natural drying oils are the preferred oxygen curing compound, and the most preferred natural drying oil is tung oil.

The use of siccatives in the method of this invention reduces the time period between exposure of the modified composition to moisture and the time when the cured surface allows hardenable protective coating compositions to be applied generating flaw-free films. These siccatives are added to the room temperature vulcanizable silicone composition and can be metal carboxylates which act as either surface dryers or depth dryers. As surface dryers, cobalt octoate and manganese octoate are more preferred. Other dryers include lead, calcium, zirconium, and zinc octoates and napthenates. Siccatives and titanate catalysts provide a synergetic effect to improve the cure rate and improve the paint coverage for latex paint and the surface of the cured modified composition can be painted sooner after exposure to moisture. The amount of siccative is preferably from 0.1 to 0.5 weight percent metal based on the total weight of the modified composition.

In addition to siccatives, a photosensitizer can be added to the room temperature vulcanizable composition to improve the adhesion of the hardenable protective coating to the surface of the modified composition. Photosensitizer includes benzophenone. A preferred method includes the use of oiticica oil and benzopheone which provides flaw-free films when painted with latex paint and alkyd paint. The adhesion of the latex paint and the alkyd paint is improved by the combination of oiticica oil and the benzophenone. The amount of photosensitizer is preferably from 0.01 to 5 weight percent based on the total weight of the modified composition.

The following examples are presented for illustrative purposes and should not be construed as limiting the present invention which is properly delineated in the claims. In the examples, part or parts is by weight and viscosities were measured at 25° C. The latex paint used in the following examples was Sherwin Williams HWI(R) satin gloss acrylic latex, coach black {HWI No. 778,055 O/M (4)}, formulated for exterior aluminum siding, wood, and masonry. The alkyd (oil based) paint used in the following examples was Sherwin Williams HWI(R) gloss enamel, heavy duty alkyd, OSHA red {HWI No. 771,821W50 R728 O/M (1–4)}, formulated for interior and exterior wood and metal. Sherwin Williams address is 1375 Euclid Avenue, Cleveland, Ohio, USA, 44115.

EXAMPLE 1

A modified room temperature vulcanizable (RTV) silicone composition was prepared by making a base composition. In a mixer, 100 parts of a polydimethylsiloxane having about 85% silicon-bonded hydroxyl endgroups and about 15% trimethylsiloxy endgroups and a viscosity of about 12.5 Pa.s, 3 parts of a hydroxyl endblocked polydimethylsiloxane having a viscosity of about 0.04 Pa.s, 81 parts of calcium carbonate having its surface treated with calcium stearate and having an average particle diameter of about 0.04 micrometer, 16 parts of calcium carbonate having its surface treated with calcium stearate and having an average particle diameter of about 3 micrometers, and 2.1 parts of tung oil were mixed under a vacuum to obtain a base composition (Base 1).

A catalyst composition was prepared by mixing the following ingredients under conditions which excluded exposure to atmospheric moisture: 100 parts of a trimethylsiloxy terminated polydimethylsiloxane having a viscosity of 60 Pa.s, 41 parts of carbon black (finely divided), 51 parts of gammaaminopropyltriethoxysilane, 62 parts of tetra(n-propyl) ortho silicate, and 2.6 parts of dibutyl tin dilaurate.

Another base composition (Base 2) was prepared as described above except the tung oil was left out.

A Composition 1 was prepared by mixing 100 parts of Base 1 with 5 parts of catalyst and then making test pieces of 2.54 mm thick by 101.6 mm long by 38.1 mm wide. These test pieces were made by laying down the composition in a chase, then exposing it to 50% relative humidity at 25° C. for a period of time as shown in Table I before coating with either an acrylic latex paint or an alkyd paint (oil based). The same latex paint and the same alkyd paint was used in this example and the other examples herein. The paint coverage was observed with the results shown in Table I and recorded according to the following rating system

| RATING | PAINT COVERAGE |
| --- | --- |
| 0 | <10% of surface covered |
| 1 | 10–40% of surface covered |
| 2 | 40–70% of surface covered |
| 3 | 70–95% of surface covered |
| 4 | 95–100% of surface covered |

The adhesion of the paint to the curing composition was measured after the periods shown in Table I. The adhesion of the paint to the surface of the cured or curing composition was determined by the tape test method, ASTM-D3359-78. A square of about 25.4 mm on a side was cross-hatched and then tape with an adhesive surface was pressed firmly on the cross-hatched area and then pulled at about 180 degree angle. The amount of paint adhered was determined by observing the remaining sections of the cross-hatched area and the following rating system was used to compare the paint adhesion. The results were rated as shown in Table I.

| RATING | PERCENT PAINT ADHESION |
| --- | --- |
| 0 | No paint adhesion |
| 1 | <20% adhesion |
| 2 | 20–40% adhesion |
| 3 | 40–70% adhesion |
| 4 | 70–95% adhesion |
| 5 | 95–100% adhesion |

Comparative Composition 1 was prepared by mixing 100 parts of Base 2 and 5 parts of the catalyst. Test pieces were made and the paint coverage and paint adhesion were determined in the same manner as described above for Composition 1. The results were as described in Table I.

TABLE I

| COMPOSITION | TIME(1) PERIOD BEFORE PAINTING | PAINT COVERAGE RATING | | PAINT ADHESION RATING | | | | | |
| --- | --- | --- | --- | --- | --- | --- | --- | --- | --- |
| | | | | 24 HR(2) | | 7 DAYS(2) | | 21 DAYS(2) | |
| | | LATEX | OIL | LATEX | OIL | LATEX | OIL | LATEX | OIL |
| 1 | 1 HR | 2 | 4 | 5 | 0 | 5 | 5 | 5 | 5(3) |
| 1 | 4 HR | 2 | 4 | 5 | 0 | 5 | 5 | 5 | 5(3) |
| 1 | 24 HR | 3 | 4 | 0 | 0 | 0 | 5 | 0 | 5 |
| 1 | 48 HR | 4 | 4 | 0 | 5 | 0 | 5 | 0 | 5 |
| 1 | 7 DAYS | 4 | 4 | 0 | 5 | 0 | 5 | 3 | 5 |
| 1 | 21 DAYS | 4 | 4 | 5 | 5 | 5 | 5 | — | — |
| 1C(4) | 1 HR | 4 | 4 | 5 | 0 | 5 | 5 | 5 | 5(3) |
| 1C | 4 HR | 4 | 4 | 5 | 2 | 5 | 5 | 5 | 5(3) |
| 1C | 24 HR | 4 | 4 | 0 | 0 | 0 | 0 | 0 | 0 |

TABLE I-continued

| COMPOSITION | TIME(1) PERIOD BEFORE PAINTING | PAINT COVERAGE RATING | | PAINT ADHESION RATING | | | | | |
|---|---|---|---|---|---|---|---|---|---|
| | | | | 24 HR(2) | | 7 DAYS(2) | | 21 DAYS(2) | |
| | | LATEX | OIL | LATEX | OIL | LATEX | OIL | LATEX | OIL |
| 1C | 48 HR | 4 | 4 | 0 | 0 | 0 | 0 | 0 | 0 |
| 1C | 7 DAYS | 3 | 4 | 0 | 0 | 0 | 0 | 0 | 0 |
| 1C | 21 DAYS | 1 | 4 | 0 | 0 | 0 | 0 | — | — |

(1) Time period after test piece was made and before paint was applied to the surface of the test piece.
(2) Paint drying time before adhesion was evaluated.
(3) Oil paint was tacky to touch.
(4) C means Comparative Composition Paint coverage and paint adhesion was only observed with Comparative Composition 1 before the composition was completely cured, but the surface of the alkyd paint was tacky showing that the uncured composition interfered with the hardening of the paint. Composition 1 which contained tung oil exhibited excellent paint coverage for both the latex and the oil based paints once the composition cured and also the adhesion was excellent after the paint hardened. The cured surface of Composition 1 was borderline dull at 24 hours exposure to moisture before painting and had a dull surface at 48 hours exposure to moisture before painting. The surface of Comparative Composition 1C was not cured to an elastomeric surface after 21 days.

EXAMPLE 2

A modified RTV silicone composition was prepared by mixing the following ingredients under condition which prevented exposure to atmospheric moisture and were mixed in the order listed: 100 parts of polydimethylsiloxane having about 85% silicon-bonded hydroxyl endgroups and about 15% trimethylsiloxy endgroups and a viscosity of about 12.5 Pa.s, 11 parts of fumed silica filler, 6 parts of a 50/50 weight mixture of methyltriacetoxysilane and ethyltriacetoxysilane, 0.03 part of dibutyl tin dilaurate, and 1.18 parts of tung oil. The resulting composition (Composition 2) was stored in containers which prevented the exposure to atmospheric moisture. The composition did not exhibit separation of the tung oil from the composition upon aging in the container for one week at room temperature or for two weeks at 50° C.

Comparative Composition 2 was prepared as described for Composition 2, except the tung oil was left out.

Test pieces were made as described in Example 1 by extruding the composition from the container and testing the test pieces as described in Example 1. The results were as shown in Table II.

TABLE II

| COMPOSITION | TIME(1) PERIOD BEFORE PAINTING | PAINT COVERAGE RATING | | PAINT ADHESION RATING | | | | | |
|---|---|---|---|---|---|---|---|---|---|
| | | | | 24 HR(2) | | 7 DAYS(2) | | 21 DAYS(2) | |
| | | LATEX | OIL | LATEX | OIL | LATEX | OIL | LATEX | OIL |
| 2 | 1 HR | 4 | 4 | 0 | 0 | 0 | 2 | 0 | 3 |
| 2 | 4 HR | 3 | 4 | 0 | 1 | 0 | 4 | 0 | 3 |
| 2 | 24 HR | 3 | 4 | 0 | 5 | 0 | 5 | 0 | 5 |
| 2 | 48 HR | 4 | 4 | 0 | 5 | 0 | 5 | 0 | 5 |
| 2 | 7 DAYS | 4 | 4 | 0 | 5 | 0 | 5 | 0 | 5 |
| 2 | 21 DAYS | 4 | 4 | 3 | 4 | 3 | 5 | 3 | 4 |
| 2C(4) | 1 HR | 2 | 4 | 0 | 0 | 0 | 0 | 0 | 0 |
| 2C | 4 HR | 3 | 4 | 0 | 0 | 0 | 0 | 0 | 0 |
| 2C | 24 HR | 1 | 4 | 0 | 0 | 0 | 0 | 0 | 0 |
| 2C | 48 HR | 0 | 4 | 0 | 0 | 0 | 0 | 0 | 0 |
| 2C | 7 DAYS | 0 | 4 | 0 | 0 | 0 | 0 | 0 | 0 |
| 2C | 21 DAYS | 2 | 4 | 0 | 0 | 0 | 0 | 0 | 0 |

(1) Time period after test piece was made and before paint was applied to the surface of the test piece.
(2) Paint drying time before adhesion was evaluated.
(4) C means Comparative Composition The presence of tung oil improves the paint coverage of the latex paint and substantially improves the adhesion of alkyd paint and showed some improved adhesion with latex paint after 21 days of sealant cure. The cured surface of Composition 2 was borderline dull at 24 hours after exposure to moisture and had a dull surface at 48 hours after exposure to moisture. Comparative Composition 2C did not have a dull surface after 21 days exposure to moisture.

EXAMPLE 3

A modified RTV silicone composition, Composition 3, was prepared by mixing 100 parts of a hydroxyl endblocked polydimethylsiloxane having a viscosity of 50 Pa.s, 40 parts of a trimethylsiloxy terminated polydimethyl-siloxane having a viscosity of 0.1 Pa.s, 175 parts of calcium carbonate treated ground calcium carbonate, 10 parts of fumed silica filler, 3 parts of a hydroxyl endblocked poly(methylphenylsiloxane) having an average of three methyl-phenylsiloxane units per molecule, 9 parts of methyltrimethoxy-silane, 3 part of diisopropoxy di(ethoxyacetoacetyl) titanate, 0.2 part of beta-aminoethyl-N-gamma-aminopropyltrimethoxysilane, and 1.5 parts of tung oil. When the methoxysilane was present, the mixing process was done in a closed system to protect the composition from atmospheric moisture. The tung oil was admixed into the composition just before the composition was extruded to make the test pieces.

Comparative Composition 3 was prepared as described above for Composition 3, except the tung oil was left out.

Test pieces were made as described in Example 1 by extruding the composition from the container and testing the test pieces as described in Example 1. The results were as shown in Table III.

Composition 4 was prepared as described above for Comparative Composition 4, except 2.4 parts of tung oil

TABLE III

| COMPOSITION | TIME(1) PERIOD BEFORE PAINTING | PAINT COVERAGE RATING | | PAINT ADHESION RATING | | | | | |
|---|---|---|---|---|---|---|---|---|---|
| | | | | 24 HR(2) | | 7 DAYS(2) | | 21 DAYS(2) | |
| | | LATEX | OIL | LATEX | OIL | LATEX | OIL | LATEX | OIL |
| 3 | 1 HR | 3 | 4 | 0 | 5 | 5 | 5 | 5 | 5 |
| 3 | 4 HR | 0 | 4 | 0 | 0 | 2 | 0 | 5 | 4 |
| 3 | 24 HR | 0 | 4 | 0 | 5 | 0 | 5 | 3 | 5 |
| 3 | 48 HR | 3 | 4 | 0 | 5 | 0 | 5 | 3 | 5 |
| 3 | 7 DAYS | 4 | 4 | 0 | 5 | 3 | 5 | 5 | 5 |
| 3 | 21 DAYS | 4 | 4 | 5 | 5 | 5 | 5 | 5 | 5 |
| 3C(4) | 1 HR | 0 | 4 | 0 | 4 | 5 | 5 | 5 | 5 |
| 3C | 4 HR | 0 | 4 | 0 | 0 | 3 | 4 | 5 | 4 |
| 3C | 24 HR | 0 | 4 | 0 | 0 | 0 | 5 | 0 | 0 |
| 3C | 48 HR | 0 | 4 | 0 | 3 | 0 | 0 | 0 | 0 |
| 3C | 7 DAYS | 0 | 4 | 0 | 0 | 0 | 0 | 0 | 0 |
| 3C | 21 DAYS | 0 | 4 | 0 | 0 | 0 | 0 | 0 | 0 |

(1) Time period after test piece was made and before paint was applied to the surface of the test piece.
(2) Paint drying time before adhesion was evaluated.
(4) C means Comparative Composition The tung oil improved the paint coverage of the latex paint and the adhesion of both the latex and alkyd paint. The cured surface of Composition 3 was borderline dull at 48 hours after exposure to moisture and was dull at 7 days after exposure to moisture. Comparative Composition 3C did not develop a dull surface after 21 days exposure to moisture.

EXAMPLE 4

An RTV silicone composition, Comparative Composition 4, was prepared by mixing under conditions which excluded exposure to atmospheric moisture, 100 parts of a hydroxyl endblocked polydimethylsiloxane having a viscosity of 50 Pa.s, 130 parts of ground calcium carbonate, 6 parts of methylvinyl-bis-(N-methylacetamido)silane, 2 parts of dimethylforamide, and 3 parts of an aminoxy silicon polymer having per molecule trimethylsiloxy terminating units, an average of three dimethyl-siloxane units, and an average of methyl(diethylaminoxy)siloxane units. The resulting composition was stored in a container which prevented exposure to atmospheric moisture.

Composition 4 was prepared as described above for Comparative Composition 4, except 2.4 parts of tung oil was admixed into the composition just before the composition was used to make test pieces and then tested in accordance with the description in Example 1.

Composition 5 was prepared as described above for Composition 4, except 24 parts of a trimethylsiloxy terminated polydimethylsiloxane having a viscosity of 0.1 Pa.s was admixed with it and the composition was tested as described for Composition 4.

The results of the test were as described in Table IV.

TABLE IV

| COMPOSITION | TIME(1) PERIOD BEFORE PAINTING | PAINT COVERAGE RATING | | PAINT ADHESION RATING | | | | | |
|---|---|---|---|---|---|---|---|---|---|
| | | | | 24 HR(2) | | 7 DAYS(2) | | 21 DAYS(2) | |
| | | LATEX | OIL | LATEX | OIL | LATEX | OIL | LATEX | OIL |
| 4C(4) | 1 HR | 1 | 4 | 0 | 0 | 0 | 0 | 0 | 0 |
| 4C | 4 HR | 3 | 4 | 0 | 0 | 0 | 0 | 0 | 0 |
| 4C | 24 HR | 2 | 4 | 0 | 0 | 0 | 0 | 0 | 0 |
| 4C | 48 HR | 1 | 4 | 0 | 0 | 0 | 0 | 0 | 0 |
| 4C | 7 DAYS | 0 | 4 | 0 | 0 | 0 | 0 | 0 | 0 |
| 4C | 21 DAYS | 1 | 4 | 0 | 0 | 0 | 0 | 0 | 0 |
| 4 | 1 HR | 1 | 4 | 0 | 0 | 0 | 2 | 0 | 5 |
| 4 | 4 HR | 3 | 4 | 0 | 1 | 0 | 4 | 0 | 5 |
| 4 | 24 HR | 0 | 4 | 0 | 0 | 0 | 5 | 0 | 0 |
| 4 | 48 HR | 0 | 4 | 0 | 0 | 0 | 0 | 0 | 3 |
| 4 | 7 DAYS | 4 | 4 | 0 | 0 | 0 | 1 | 0 | 0 |
| 4 | 21 DAYS | 4 | 4 | 0 | 5 | 0 | 5 | 0 | 4 |
| 5 | 1 HR | 2 | 4 | 0 | 0 | 0 | 0 | 0 | 0 |
| 5 | 4 HR | 2 | 4 | 0 | 0 | 0 | 0 | 0 | 0 |
| 5 | 24 HR | 3 | 4 | 0 | 0 | 0 | 0 | 0 | 3 |
| 5 | 48 HR | 0 | 4 | 0 | 0 | 0 | 0 | 0 | 5 |
| 5 | 7 DAYS | 3 | 4 | 0 | 0 | 0 | 4 | 4 | 4 |
| 5 | 21 DAYS | 4 | 4 | 5 | 5(5) | 5 | 5(5) | 4 | 4 |

(1) Time period after test piece was made and before paint was applied to the surface of the test piece.
(2) Paint drying time before adhesion was evaluated.
(4) C means Comparative Composition
(5) The test piece tore before the paint separated from the cured composition.

The presence of the tung oil in the composition improved the paint coverage of latex paint and improved the adhesion of both the latex and the oil based paints, however this particular composition would be less preferred than others described herein. Composition 4 had a dull surface at 7 days after exposure to moisture, Composition 5 had a dull surface at 21 days exposure to moisture and had a borderline dull surface at 7 days after exposure to moisture. Comparative Composition 4C did not develop a dull surface after 21 days exposure to moisture.

EXAMPLE 5

A base was made by mixing 100 parts of a hydroxyl endblocked polydimethylsiloxane having a viscosity of 50 Pa.s, 9 parts of a ketoximosilane mixture of approximately 70 weight percent methyltri(methylethylketoximo)-silane, 24 weight percent methyldi(methylethylketoximo)methoxy-silane, 0.5 weight percent methyldimethoxy(methylethylketoximo)-silane, and 5.5 weight percent impurities, and 80 parts of a ground calcium carbonate. This base was then used to make several compositions in which siccatives, stabilizers, and catalysts were varied to enhance the properties of the compositions. The amounts used were parts added to 189 parts of base and were as described in Table V and the paint coverage and the adhesion were determined on test pieces and with the tests as described in Example 1. The results were as shown in Table VI. In this example, the results shown are those in which the test piece was allowed to be exposed to atmospheric moisture for 7 days prior to applying the paint.

TABLE V

| IN-GREDIENT | COMPOSITION | | | | | | | | |
|---|---|---|---|---|---|---|---|---|---|
|  | 5C | 6 | 7 | 8 | 9 | 10 | 11 | 12 | 13 |
| tung oil | 0 | 1.5 | 1.5 | 1.5 | 1.5 | 1.5 | 1.5 | 1.5 | 1.5 |
| Cobalt Octoate | 0 | 0.06 | 0.06 | 0 | 0.06 | 0.06 | 0 | 0 | 0 |
| Cobalt Naphthenate | 0 | 0 | 0 | 0 | 0 | 0 | 0.06 | 0 | 0 |
| Manganese Octoate | 0 | 0 | 0 | 0 | 0 | 0 | 0 | 0.06 | 0 |
| 1,10-phenanthroline | 0 | 0.04 | 0 | 0 | 0.04 | 0 | 0.04 | 0.04 | 0 |
| dibutyl tin dilaurate | 0.1 | 0 | 0 | 0 | 0.1 | 0.1 | 0.1 | 0.1 | 0.1 |
| diisopropoxy di-(ethoxyacetoacetyl) titanate | 0 | 2.0 | 2.0 | 2.0 | 0 | 0 | 0 | 0 | 0 |

TABLE VI

| COM-POSITION | PAINT COVERAGE RATING | | PAINT ADHESION RATING | | | |
|---|---|---|---|---|---|---|
|  |  |  | 3 DAYS(2) | | 18 DAYS(2) | |
|  | LATEX | OIL | LATEX | OIL | LATEX | OIL |
| 5C(4) | 0 | 4 | 0 | 0 | 0 | 0 |
| 6 | 4 | 4 | 5 | 5 | 5 | 5 |
| 7 | 4 | 4 | 1 | 5 | 4 | 5 |
| 8 | 4 | 4 | 0 | 5 | 0 | 5 |
| 9 | 0 | 4 | 0 | 0 | 0 | 0 |
| 10 | 4 | 4 | 0 | 5 | 0 | 5 |
| 11 | 0 | 4 | 0 | 0 | 0 | 0 |
| 12 | 4 | 4 | 5 | 5 | 5 | 5 |
| 13 | 4 | 4 | 5 | 5 | 5 | 5 |

(2) Paint drying time before adhesion was evaluated.
(4) C means Comparative Composition Paint coverage and adhesion were improved as shown by Table VI when tung oil, siccatives, and stabilizers were used. However, a combination of a cobalt siccative, dibutyl tin dilaurate, and 1,10-phenanthroline stabilizer was ineffective in improving paint adhesion at the concentrations investigated for these types of compositions, see Compositions 9 and 11. Siccatives cobalt octoate and manganese octoate exhibited excellent latex and oil paint adhesion after 3 days. Compositions 6, 7, 8, 10, 12, and 13 had a dull surface at 3 days after exposure to moisture. Compositions 9 and 11 and Comparative Composition 5C did not have dull surfaces at 3 days after exposure to moisture.

EXAMPLE 6

An RTV silicone composition was prepared by mixing under conditions which protected against the ingress of moisture: 100 parts of a hydroxyl endblocked polydimethyl-siloxane having a viscosity of 50 Pa.s, 1.2 parts of a ketoximosilane mixture of approximately 70 weight percent methyltri(methylethylketoximo)silane, 24 weight percent methyldi(methylethylketoximo)methoxysilane, 0.5 weight percent methyldimethoxy(methylethylketoximo)silane, and 5.5 weight percent impurities, and 1 part of methylvinyldi(N-methylacetamido)-silane. To the resulting mixture, 7 parts of the ketoximosilane mixture and 3 parts of a fluorocarbon alcohol, FC-10, sold by Minnesota Mining and Manufacturing Company (3M) Minneapolis, Minnesota, was added and mixed to homogenity. FC-10 was a fluorocarbon alcohol product which was a mixture of species from the formula

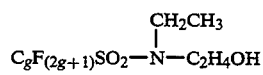

in which g has a value of from 6 to 20. Next, 60 parts of stearic acid treated precipitated calcium carbonate filler and 0.5 part of a polymer of 2,5-furandione with 1,3-butadiene were admixed to homogeneity and then 0.3 part of beta-aminoethylgamma-aminopropyltrimethoxysilane, 0.3 part of gamma-glycidoxypropyltimethoxysilane, and dibutyl tin dilaurate were admixed to provide the RTV silicone composition, Comparative Composition 6.

A modified RTV silicone composition, Composition 14, was prepared by adding 1.5 parts of tung oil into 173.3 parts of Comparative Composition 6 in a high shear mixer which excluded moisture.

A modified RTV silicone composition, Composition 15, was prepared by mixing 1.5 parts of tung oil into 170.3 parts of a composition prepared in the same manner as Comparative Composition 6, except the fluorocarbon alcohol was left out. The resulting mixture was mixed in a high shear mixer which excluded moisture.

A modified RTV silicone composition, Composition 16, was prepared by mixing 1.5 parts of tung oil into 122.8 parts of a composition prepared in the same manner as Comparative Composition 6, except the 60 parts of the stearic acid treated calcium carbonate filler was replaced with 10 parts of fumed silica filler, and the 0.5 part of the polymer of 2,5-furandione with 1,3-butadiene was left out. The resulting mixture was mixed in a high shear mixer which excluded moisture.

A modified RTV silicone composition, Composition 17, was prepared by mixing with 173.3 parts of Comparative Composition 6, 1.5 parts of tung oil and 2 parts of a parafinic hydrocarbon oil (an extending oil, Isopar L, sold by Exxon Chemical Co., Performance Products Group, of Houston, Texas).

A modified RTV silicone composition, Composition 18, was prepared by mixing 0.87 part of tung oil with 173.3 parts of Comparative Composition 6 in a high shear mixer which excluded moisture.

A modified RTV silicone composition, Composition 19, was prepared by mixing 1.75 parts of tung oil with 173.3 parts of Comparative Composition 6 in a high shear mixer which excluded moisture.

A modified RTV silicone composition, Composition 20, was prepared by mixing 7.22 parts tung oil with 173.3 parts of Comparative Composition 6 in a high shear mixer which excluded moisture.

Test pieces of each of the above comparative composition and the compositions were prepared and tested as described in Example 1 for paint coverage and adhesion. The results obtained were as shown in Table VII.

had dull surfaces at 7 days after exposure to moisture. Composition 15 had a borderline dull surface at 7 days after exposure to moisture and a dull surface at 21 days after exposure to moisture. Comparative Composition 6C did not develop a dull surface after 21 days exposure to moisture.

TABLE VII

| COMPOSITION | TIME(1) PERIOD BEFORE PAINTING | PAINT COVERAGE RATING | | PAINT ADHESION RATING | | | | | |
| --- | --- | --- | --- | --- | --- | --- | --- | --- | --- |
| | | | | 24 HR(2) | | 7 DAYS(2) | | 21 DAYS(2) | |
| | | LATEX | OIL | LATEX | OIL | LATEX | OIL | LATEX | OIL |
| 6C(4) | 1 HR | 3 | 4 | 0 | 0 | 0 | 1 | 0 | 3 |
| 6C | 4 HR | 1 | 4 | 0 | 0 | 0 | 2 | 0 | 0 |
| 6C | 24 HR | 0 | 4 | 0 | 0 | 0 | 2 | 0 | 0 |
| 6C | 48 HR | 0 | 4 | 0 | 0 | 0 | 0 | 0 | 0 |
| 6C | 7 DAYS | 0 | 4 | 0 | 0 | 0 | 0 | 0 | 0 |
| 6C | 21 DAYS | 0 | 4 | 0 | 0 | 0 | 0 | 0 | 0 |
| 14 | 1 HR | 1 | 4 | 0 | 2 | 0 | 5 | 0 | 5 |
| 14 | 4 HR | 2 | 4 | 0 | 0 | 0 | 2 | 5 | 4 |
| 14 | 24 HR | 1 | 4 | 0 | 3 | 0 | 5 | 3 | 5 |
| 14 | 48 HR | 2 | 4 | 0 | 4 | 0 | 5 | 3 | 5 |
| 14 | 7 DAYS | 4 | 4 | 1 | 5 | 5 | 4 | 5 | 5 |
| 14 | 21 DAYS | 4 | 4 | 2 | 5 | 5 | 5 | 5 | 4 |
| 15 | 1 HR | 3 | 4 | 5 | 0 | 5 | 5 | 5 | 5 |
| 15 | 4 HR | 1 | 4 | 0 | 0 | 0 | 3 | 0 | 3 |
| 15 | 24 HR | 3 | 4 | 0 | 0 | 0 | 0 | 0 | 0 |
| 15 | 48 HR | 1 | 4 | 0 | 0 | 0 | 2 | 0 | 4 |
| 15 | 7 DAYS | 3 | 4 | 0 | 5 | 0 | 5 | 5 | 5 |
| 15 | 21 DAYS | 4 | 4 | 5 | 5 | 5 | 5 | 5 | 5 |
| 16 | 1 HR | 0 | 4 | 0 | 0 | 0 | 0 | 0 | 5 |
| 16 | 4 HR | 0 | 4 | 0 | 0 | 0 | 2 | 0 | 5 |
| 16 | 24 HR | 1 | 4 | 0 | 5 | 0 | 5 | 0 | 5 |
| 16 | 48 HR | 1 | 4 | 0 | 5 | 0 | 5 | 0 | 5 |
| 16 | 7 DAYS | 4 | 4 | 0 | 5 | 0 | 2 | 0 | 3 |
| 16 | 21 DAYS | 4 | 4 | 3 | 0 | 2 | 2 | 3 | 0 |
| 17 | 1 HR | 1 | 4 | 0 | 3 | 0 | 5 | 5 | 5 |
| 17 | 4 HR | 1 | 4 | 0 | 1 | 0 | 3 | 0 | 5 |
| 17 | 24 HR | 0 | 4 | 0 | 0 | 0 | 5 | 0 | 5 |
| 17 | 48 HR | 0 | 4 | 0 | 3 | 0 | 5 | 2 | 5 |
| 17 | 7 DAYS | 4 | 4 | 1 | 5 | 4 | 4 | 5 | 5 |
| 17 | 21 DAYS | 4 | 4 | 5 | 5 | 5 | 5 | 5 | 4 |
| 18 | 1 HR | 1 | 4 | 0 | 5 | 0 | 0 | 0 | 0 |
| 18 | 4 HR | 0 | 4 | 0 | 0 | 0 | 0 | 0 | 0 |
| 18 | 24 HR | 0 | 4 | 0 | 3 | 0 | 0 | 0 | 0 |
| 18 | 48 HR | 0 | 4 | 0 | 1 | 0 | 5 | 0 | 5 |
| 18 | 7 DAYS | 4 | 4 | 0 | 5 | 3 | 5 | 5 | 5 |
| 18 | 21 DAYS | 4 | 4 | 5 | 5 | 5 | 5 | 5 | 5 |
| 19 | 1 HR | 1 | 4 | 0 | 0 | 0 | 2 | 0 | 3 |
| 19 | 4 HR | 0 | 4 | 0 | 0 | 0 | 0 | 0 | 0 |
| 19 | 24 HR | 0 | 4 | 0 | 0 | 0 | 4 | 0 | 5 |
| 19 | 48 HR | 1 | 4 | 0 | 0 | 0 | 5 | 1 | 5 |
| 19 | 7 DAYS | 4 | 4 | 0 | 5 | 2 | 5 | 5 | 4 |
| 19 | 21 DAYS | 4 | 4 | 5 | 5 | — | — | 5 | 4 |
| 20 | 1 HR | 1 | 4 | 0 | 5 | 5 | 5 | 5 | 5 |
| 20 | 4 HR | 1 | 4 | 0 | 0 | 0 | 5 | 0 | 5(6) |
| 20 | 24 HR | 0 | 4 | 0 | 2 | 0 | 5(6) | 0 | 5(6) |
| 20 | 48 HR | 2 | 4 | 0 | 5 | 0 | 5(6) | 0 | 5(6) |
| 20 | 7 DAYS | 4 | 4 | 0 | 5 | 0 | 5(6) | 5 | 5 |
| 20 | 21 DAYS | 4 | 4 | 5 | 5 | 3 | 5 | 5 | 5 |

(1) Time period after test piece was made and before paint was applied to the surface of the test piece.
(2) Paint drying time before adhesion was evaluated.
(4) C means Comparative Composition.
(6) Paint wrinkled when hardened.

Composition 16 which contain silica filler showed improvement in paint coverage and paint adhesion but such compositions would not be preferred. Compositions containing tung oil in amounts from 0.87 to 7.22 parts resulted in improved paint coverage and paint adhesion, see Compositions 18, 19, and 20. However, Composition 20 which contained 7.22 parts tung oil had a slower cure time which indicated that large amounts of tung oil would not be suitable. Isopar L may be present in these modified RTV compositions without resulting in any noticeable effects on the paint adhesion or paint coverage, compare the results of Composition 14 and 17 in Table VII. Compositions 14, 17, 18, 19, and 20

EXAMPLE 7

An RTV silicone sealant was obtained by preparing a base as described in Example 5 and adding 1.5 parts of diisopropoxy di-(ethoxyacetoacetyl) titanate and 0.2 part of cobalt octoate and an amount of an oil, as the oxygen curing compound, to make modified RTV silicone compositions where the oil or mixtures containing an oil were as described in Table VIII. The paint coverage and the paint adhesion were tested as described in Example 1.

TABLE VIII

| COMPOSITION | OIL | PARTS OF OIL |
| --- | --- | --- |
| 7C(4) | NONE | 0 |
| 21 | RAW LINSEED OIL | 1.66 |
| 22 | VERNONIA OIL | 1.61 |
| 23 | BOILED LINSEED OIL | 1.68 |
| 24 | TUNG OIL(7) | 1.75 |
| 25(8) | OITICICA OIL | 1.51 |
| 26(8) | RAW LINSEED OIL | 1.60 |
| 27(8) | RAW TUNG OIL | 1.53 |
| 8C(4)(8) | NONE | 0 |

(4) C means Comparative Composition
(7) A mixture of 1.75 part tung oil, 0.04 part of benzophenone, and 0.28 part the ketoximosilane mixture described in Example 5.
(8) This composition did not contain cobalt octoate and did contain 0.04 part of benzophenone.

develop a dull surface after 32 days exposure to moisture.

EXAMPLE 8

An RTV silicone composition was prepared by mixing in a container which excluded atmospheric moisture 100 parts of a hydroxyl endblocked polydimethylsiloxane having a viscosity of 50 Pa.s, 40 parts of a trimethylsiloxy endblocked polydimethylsiloxane having a viscosity of 0.1 Pa.s, 175 parts of calcium carbonate having its surface treated with calcium stearate and having an average particle diameter of about 3 micrometers, 10 parts of fumed silica filler, 3 parts of hydroxyl endblocked poly(methylphenylsiloxane) having an average of about three methylphenylsiloxane units per molecule,

TABLE IX

| COMPOSITION | TIME(1) PERIOD BEFORE PAINTING | PAINT COVERAGE RATING | | PAINT ADHESION RATING | | | | | | | | |
| --- | --- | --- | --- | --- | --- | --- | --- | --- | --- | --- | --- | --- |
| | | | | 24 HR(2) | | 6 DAYS(2) | | 11 DAYS(2) | | 20 DAYS(2) | | 30 DAYS(2) | |
| | | LATEX | OIL | LATEX | OIL | LATEX | OIL | LATEX | OIL | LATEX | OIL | LATEX | OIL |
| 7C(4) | 11 DAYS | 0 | 4 | — | — | 0 | 0 | — | — | 0 | 0 | — | — |
| 7C | 21 DAYS | 0 | 4 | — | — | — | — | 0 | 0 | — | — | 0 | 0 |
| 7C | 32 DAYS | 0 | 4 | — | — | — | — | — | — | 0 | 0 | — | — |
| 21 | 11 DAYS | 4 | 4 | — | — | 0 | 0 | — | — | 0 | 0 | — | — |
| 21 | 21 DAYS | 4 | 4 | — | — | — | — | 0 | 0 | — | — | 0 | 0 |
| 21 | 32 DAYS | 4 | 4 | — | — | — | — | — | — | 0 | 0 | — | — |
| 22 | 11 DAYS | 1 | 4 | — | — | 0 | 0 | — | — | 0 | 0 | — | — |
| 22 | 21 DAYS | 3 | 4 | — | — | — | — | 0 | 0 | — | — | 0 | 0 |
| 22 | 32 DAYS | 4 | 4 | — | — | — | — | — | — | 0 | 0 | — | — |
| 23 | 11 DAYS | 3 | 4 | — | — | 0 | 0 | — | — | 0 | 0 | — | — |
| 23 | 21 DAYS | 4 | 4 | — | — | — | — | 0 | 0 | — | — | 0 | 0 |
| 23 | 32 DAYS | 4 | 4 | — | — | — | — | — | — | 0 | 0 | — | — |
| 24 | 11 DAYS | 4 | 4 | — | — | 5 | 5 | — | — | 5 | 5 | — | — |
| 24 | 21 DAYS | 4 | 4 | — | — | — | — | 5 | 5 | — | — | 5 | 5 |
| 24 | 32 DAYS | 4 | 4 | — | — | — | — | — | — | 5 | 5 | — | — |
| 25 | 10 DAYS | 4 | 4 | 4 | 5 | — | — | — | — | — | — | — | — |
| 26 | 10 DAYS | 1 | 4 | 0 | 0 | — | — | — | — | — | — | — | — |
| 27 | 10 DAYS | 4 | 4 | 5 | 5 | — | — | — | — | — | — | — | — |
| 8C | 10 DAYS | 1 | 4 | 0 | 0 | — | — | — | — | — | — | — | — |

(1) Time period after test piece was made and before paint was applied to the surface of test piece.
(2) Paint drying time before adhesion was evaluated.
(4) C means Comparative Composition.

The paint coverage for the latex paint was improved by the addition of raw linseed oil, vernonia oil, boiled linseed oil, tung oil, and oiticica. The most improved adhesion was observed in these formulations when tung oil and oiticica oil was used. Compositions 21 and 24 had a dull surface at 11 days after exposure to moisture. Composition 22 had a dull surface at 32 days after exposure to moisture. Composition 23 had a borderline dull surface at 11 days after exposure to moisture and a dull surface at 21 days after exposure to moisture. Compositions 25 and 27 had dull surfaces at 10 days after exposure to moisture. Comparative Composition 7C did not 9 parts of methyltrimethoxysilane, 0.2 part of beta-aminoethyl-gamma-aminopropyltrimethoxysilane, and 3 parts of diisopropoxy-di(ethoxyacetoacetyl) titanium. This composition is referred to herein as Comparative Composition 9C.

A modified RTV silicone composition was prepared by preparing the above composition of this example and admixing 1.5 parts of tung oil as the last ingredient. This composition is referred to herein as Composition 28. Comparative Composition 9C and Composition 28 were evaluated as described in Example 1 for paint coverage and paint adhesion and the results were as described in Table X.

TABLE X

| COMPOSITION | TIME(1) PERIOD BEFORE PAINTING | PAINT COVERAGE RATING | | PAINT ADHESION RATING | | | | | |
| --- | --- | --- | --- | --- | --- | --- | --- | --- | --- |
| | | | | 24 HR(2) | | 7 DAYS(2) | | 21 DAYS(2) | |
| | | LATEX | OIL | LATEX | OIL | LATEX | OIL | LATEX | OIL |
| 9C(4) | 1 HR | 0 | 4 | 0 | 4 | 5 | 5 | 5 | 5 |
| 9C | 4 HR | 0 | 4 | 0 | 0 | 3 | 4 | 5 | 4 |
| 9C | 24 HR | 0 | 4 | 0 | 0 | 0 | 5 | 0 | 0 |
| 9C | 48 HR | 0 | 4 | 0 | 3 | 0 | 0 | 0 | 0 |
| 9C | 7 DAYS | 0 | 4 | 0 | 0 | 0 | 0 | 0 | 0 |
| 9C | 21 DAYS | 0 | 4 | 0 | 0 | 0 | 0 | 0 | 0 |
| 28 | 1 HR | 3 | 4 | 0 | 5 | 5 | 5 | 5 | 5 |
| 28 | 4 HR | 0 | 4 | 0 | 0 | 2 | 0 | 5 | 4 |
| 28 | 24 HR | 0 | 4 | 0 | 5 | 0 | 5 | 3 | 5 |
| 28 | 48 HR | 3 | 4 | 0 | 5 | 0 | 5 | 3 | 5 |
| 28 | 7 DAYS | 4 | 4 | 0 | 5 | 3 | 5 | 5 | 5 |

TABLE X-continued

| COMPOSITION | TIME(1) PERIOD BEFORE PAINTING | PAINT COVERAGE RATING | | PAINT ADHESION RATING | | | | | |
|---|---|---|---|---|---|---|---|---|---|
| | | | | 24 HR(2) | | 7 DAYS(2) | | 21 DAYS(2) | |
| | | LATEX | OIL | LATEX | OIL | LATEX | OIL | LATEX | OIL |
| 28 | 21 DAYS | 4 | 4 | 5 | 5 | 5 | 5 | 5 | 5 |

(1) Time period after test piece was made and before paint was applied to the surface of the test piece.
(2) Paint drying time before adhesion was evaluated.
(4) C means Comparative Composition Composition 28 had a borderline dull surface at 48 hours after exposure to moisture and a dull surface at 7 days after exposure to moisture. Comparative Composition 9C did not develop a dull surface after 21 days exposure to moisture.

EXAMPLE 9

An RTV silicone composition was prepared by mixing under conditions which protected against the ingress of moisture: 100 parts of a hydroxyl endblocked polydimethyl-siloxane having a viscosity of 50 Pa.s, 1 part of a ketoximosilane mixture of approximately 70 weight percent methyltri(methylethylketoximo)silane, 24 weight percent methyldi(methylethylketoximo)methoxysilane, 0.5 weight percent methyldimethoxy(methylethylketoximo)silane, and 5.5 weight percent impurities, and 1 part of methylvinyldi(N-methylacetamido)silane. To the resulting mixture, 12 parts of a catalyst mixture was admixed. The catalyst mixture was 0.07 part of dibutyltin dilaurate, 0.3 part of beta-aminoethyl-gamma-aminopropyltrimethoxyslane, 0.3 part of gamma-glycidoxypropyl-trimethoxysilane, 1 part of diisopropoxydi(ethoxyacetoacetyl) titanium, and 10 parts of a siloxaphobic reaction mixture prepared by mixing in a closed vessel, 30 parts of a fluorocarbon alcohol, FC-10 manufactured by 3M, which has the average formula

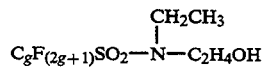

where g has an average value of 7.5 and contains species having values of 4, 5, 6, 7, and 8, and 71 parts of the ketoximosilane mixture described above. The resulting mixture was heated at 50° C. for 30 minutes under a nitrogen purge. The resulting siloxaphobic reaction mixture was 20 weight percent unreacted fluorocarbon alcohol, 60 weight percent unreacted ketoximosilane, and 12 weight percent reaction product of the formula

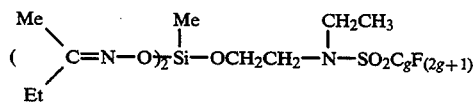

where Me is methyl radical, Et is ethyl radical and g is defined above, and 8 weight percent impurities. Next, 60 parts of stearic acid treated precipitated calcium carbonate filler and 0.5 part of a polymer of 2,5-furandione with 1,3-butadiene were admixed to homogeneity and then 1.5 parts of raw tung oil was admixed to homogeneity, followed by the admixture of 0.5 part of the ketoximosilane mixture. The resulting composition is identified herein as Composition 29.

A Composition 30 was prepared as described above for Composition 29, except 0.04 part of cobalt octoate siccative was mixed in the 0.5 part of the ketoximosilane mixture and the resulting mixture was added last.

A Composition 31 was prepared as described above for Composition 29, except 1.5 parts of oiticica oil replaced the raw tung oil.

A Composition 32 was prepared as described above for Composition 31, except 0.04 part of cobalt octoate siccative was mixed into the 0.5 part of ketoximosilane mixture added last.

A Composition 33 was prepared as described above for Composition 29, except 1.5 parts of a polymerized tung oil, TTDIA, sold by Lomas International, Macon, Georgia, replaced the raw tung oil. TTDIA has a specific gravity of 0.9910 and an acid number of 6 maximum.

A Composition 34 was prepared as described above for Composition 33, except 0.04 part of cobalt octoate siccative was mixed into the 0.5 part of ketoximosilane mixture added last.

A Composition 35 was prepared as described above for Composition 29, except 1.5 part of a low viscosity, 100% non-volatile, chemical modified polymerized oil, DOCCO No. 008 was replaced the raw tung oil. DOCCO No. 008 had an acid number of 3 maximum.

A Composition 36 was prepared as described above for Composition 35, except 0.04 part of cobalt octoate siccative was mixed into the 0.5 part of ketoximosilane mixture added last.

A Comparative Composition 10C was prepared as described for Composition 29, except it contained no oil or siccative.

Compositions 29-36 and Comparative Composition 10C were tested for paint coverage and paint adhesion as described in Example 1. The compositions cured for 14 days at 25° C. and 50% relative humidity prior to painting, except for Comparative Composition 10C which was allowed to cure for 11 days, and the paint adhesion was determined after 3 days after painting. The results were as shown in Table XI.

TABLE XI

| COMPOSITION | PAINT COVERAGE RATING | | PAINT ADHESION RATING 3 DAYS | |
|---|---|---|---|---|
| | LATEX | OIL | LATEX | OIL |
| 29 | 4 | 4 | 5 | 5 |
| 30 | 4 | 4 | 5 | 4 |
| 31 | 4(9) | 4 | 5 | 5 |
| 32 | 4 | 4 | 5 | 5 |
| 33 | 4(9) | 4 | 5 | 5 |
| 34 | 4(9) | 4 | 5 | 5 |
| 35 | 4 | 4 | 5 | 5 |
| 36 | 3 | 4 | 5 | 5 |
| 10C | 1 | 4 | 0 | 0 |

(9) Latex paint dewetted at the edges where the sealant was very thin.

Compositions 29, 30, 31, 32, 33, 34, and 35 had dull surfaces at 14 after exposure to moisture. Composition 36 had a borderline dull surface at 14 days after exposure to moisture. Comparative Composition 10C did not develop a dull surface after 11 days exposure to moisture.

That which is claimed is:

1. A method of producing a cured silicone elastomer with a surface coated with a hardened protective coating comprising
    blending a room temperature vulcanizable silicone composition comprising a polydiorganosiloxane having condensable end groups, a moisture sensitive silicon-crosslinker, and a filler with an oxygen curing compound to make a modified composition,
    exposing the modified composition to moisture until a cured elastomeric surface is obtained and a homogeneous dull surface develops, thereafter
    applying a protective coating composition selected from the group consisting of varnishes, lacquers, shellacs, and paints, hardenable at ambient conditions over at least a portion of the cured elastomeric surface where the protective coating composition wets the surface to which it is applied and produces an essentially flaw-free film, thereafter
    allowing the protective coating composition to harden.

2. The method in accordance with claim 1 further comprising storing the room temperature vulcanizable silicone composition in a first package and the oxygen curing compound in a second package prior to forming the modified composition.

3. The method in accordance with claim 1 in which the oxygen curing compound is a natural drying oil.

4. The method in accordance with claim 2 in which the oxygen curing compound is a natural drying oil.

5. The method in accordance with claim 3 in which the natural drying oil is tung oil.

6. The method in accordance with claim 4 in which the natural drying oil is tung oil.

7. The method in accordance with claim 1 in which the silicon-crosslinker is a ketoximosilicon crosslinker having at least three silicon-bonded ketoximo groups per molecule.

8. The method in accordance with claim 7 in which the room temperature vulcanizable silicone composition further comprises a curing catalyst.

9. The method in accordance with claim 8 in which the curing catalyst is a titanate catalyst.

10. The method in accordance with claim 8 in which the curing catalyst is a tin catalyst.

11. The method in accordance with claim 2 in which the room temperature vulcanizable silicone composition is stored in two packages wherein one package comprises the polydiorganosiloxane and another package comprises the moisture sensitive silicon-crosslinker.

12. The method in accordance with claim 11 in which the silicon-crosslinker is an alkoxysilicon crosslinker having at least three silicon-bonded alkoxy groups per molecule and the room temperature vulcanizable silicone composition further comprises a curing catalyst.

13. The method in accordance with claim 12 in which the curing catalyst is a tin catalyst.

14. The method in accordance with claim 1 in which the silicon-crosslinker is an alkoxysilicon compound having at least three silicon-bonded alkoxy groups per molecule and the room temperature vulcanizable silicone composition further comprises a curing catalyst.

15. The method in accordance with claim 14 in which the curing catalyst is a titanate catalyst.

16. The method in accordance with claim 7 in which the oxygen curing compound is a natural drying oil.

17. The method in accordance with claim 16 in which the natural drying oil is tung oil.

18. The method in accordance with claim 8 in which the oxygen curing compound is tung oil.

19. The method in accordance with claim 9 in which the oxygen curing compound is tung oil.

20. The method in accordance with claim 10 in which the oxygen curing compound is tung oil.

21. The method in accordance with claim 11 in which the oxygen curing compound is tung oil.

22. The method in accordance with claim 12 in which the oxygen curing compound is tung oil.

23. The method in accordance with claim 13 in which the oxygen curing compound is tung oil.

24. The method in accordance with claim 14 in which the oxygen curing compound is tung oil.

25. The method in accordance with claim 15 in which the oxygen curing compound is tung oil.

26. The method in accordance with claim 1 further comprising adding a siccative for the oxygen curing compound to the room temperature vulcanizable silicone composition.

27. The method in accordance with claim 26 in which the siccative is a surface siccative.

28. The method in accordance with claim 26 in which the siccative is a mixture of a surface siccative and a siccative for depth.

29. The method in accordance with claim 1 in which the room temperature vulcanizable silicone composition further comprises a photosensitizer.

30. The method in accordance with claim 29 in which the oxygen curing compound is a natural drying oil.

31. The method in accordance with claim 30 in which the natural drying oil is linseed oil.

32. The method ill accordance with claim 31 in which the photosensitizer is benzophenone.

33. The method in accordance with claim 30 in which the natural drying oil is oiticica oil.

34. The method in accordance with claim 33 in which the photosensitizer is benzophenone.

35. The method in accordance with claim 1 in which the condensable end groups of the polydiorganosiloxane are silicon-bonded alkoxy groups, and the moisture sensitive silicon-crosslinker is mono-organotrialkoxysilane, and the room temperature vulcanizable silicone elastomer further comprises a titanate catalyst.

36. The method in accordance with claim 35 in which the filler is calcium carbonate and the oxygen curing compound is a natural drying oil.

37. The method in accordance with claim 36 in which the natural drying oil is tung oil.

38. The method in accordance with claim 1 in which the room temperature vulcanizable silicone elastomer composition is obtained by mixing under conditions to exclude moisture a polydiorganosiloxane having hydroxyl endgroups with monoorganotriacetoxysilane as the moisture sensitive silicon-crosslinker, a tin catalyst, filler, and oxygen curing compound to make the modified composition and thereafter storing the resulting modified composition in a container which protects the composition from curing amounts of atmospheric moisture.

39. The method in accordance with claim 38 in which the filler is a silica filler and the oxygen curing compound is a natural drying oil.

40. The method in accordance with claim 39 in which the natural drying oil is tung oil.

41. The method in accordance with claim 1 in which the room temperature vulcanizable silicone elastomer composition is obtained by mixing under conditions to exclude moisture a polydiorganosiloxane having hydroxyl endgroups with a ketoximo silicon compound selected from the group consisting of silicon compounds having at least three ketoximo group per molecule and silicon compounds having both ketoximo group and alkoxy groups where there is a total of at least three ketoximo groups and alkoxy groups per molecule as the moisture sensitive silicon-crosslinker, a tin catalyst, filler, and oxygen curing compound to make the modified composition and thereafter storing the resulting modified composition in a container which protects the composition from curing amounts of atmospheric moisture.

42. The method in accordance with claim 41 in which the filler is calcium carbonate and the oxygen curing compound is a natural drying oil.

43. The method in accordance with claim 42 in which the natural drying oil is tung oil.

44. A method of producing a cured silicone elastomer with a surface coated with a hardened protective coating comprising
  blending a room temperature vulcanizable silicone composition comprising a polydiorganosiloxane having condensable end groups, a moisture sensitive silicon-crosslinker, and a filler with a protective coating adhesion additive selected from the group consisting of a natural drying oil and a mixture of a natural drying oil and a metal dryer, to make a modified composition,
  exposing the modified composition to moisture until a cured elastomeric surface is obtained and a homogeneous dull surface develops, thereafter
  applying a protective coating composition selected from the group consisting of varnishes, lacquers, shellacs, and paints, hardenable at ambient conditions over at least a portion of the cured elastomeric surface where the protective coating composition wets the surface to which it is applied and produces an essentially flaw-free film, thereafter
  allowing the protective coating composition to harden producing a cohesive bond between the protective coating composition and the cured silicone elastomer.

45. The method in accordance with claim 44 in which the protective coating adhesion additive is a natural drying oil.

46. The method in accordance with claim 45 in which the natural drying oil is tung oil.

47. The method in accordance with claim 44 in which the protective coating adhesion additive is a mixture of a natural drying oil and a siccative.

48. The method in accordance with claim 47 in which the natural drying oil is tung oil.

49. A method of producing a cured silicone elastomer with a surface coated with a hardened protective coating comprising
  mixing a polydiorganosiloxane having silanol end groups, a filler and an oxygen curing compound making a first silicone mixture,
  mixing an alkoxysilicon crosslinker selected from the group consisting of tetraalkoxysilanes and partial hydrolysis products of the tetraalkoxysilanes and a tin catalyst to make a second silicone mixture,
  blending the first silicone mixture and the second silicone mixture to provide a modified room temperature vulcanizable silicone composition,
  exposing the modified composition to moisture until a cured elastomeric surface is obtains and a homogeneous dull surface develops, thereafter
  applying a protective coating composition selected from the group consisting of varnishes, lacquers, shellacs, and paints, hardenable at ambient conditions over at least a portion of the cured elastomeric surface where the protective coating composition wets the surface to which it is applied and produces an essentially flaw-free film, thereafter
  allowing the protective coating composition to harden.

50. The method in accordance with claim 49 in which the filler is calcium carbonate, the alkoxysilicon compound is n-propyl ortho silicate, and the oxygen curing compound is a natural drying oil.

51. The method in accordance with claim 50 in which the natural drying oil is tung oil.

* * * * *